US012587956B2

(12) United States Patent
Jayaramachar et al.

(10) Patent No.: US 12,587,956 B2
(45) Date of Patent: Mar. 24, 2026

(54) METHODS, SYSTEMS, AND COMPUTER READABLE MEDIA FOR USING NETWORK FUNCTION (NF) REPOSITORY FUNCTION (NRF) TO PROVIDE MAPPING OF SINGLE NETWORK SLICE SELECTION ASSISTANCE INFORMATION (S-NSSAI) FOR ROAMING AND INTER-PUBLIC LAND MOBILE NETWORK (INTER-PLMN) TRAFFIC

(71) Applicant: Oracle International Corporation, Redwood Shores, CA (US)

(72) Inventors: Amarnath Jayaramachar, Bangalore (IN); Yesh Goel, Bangalore (IN); Doki Satish Kumar Patro, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 553 days.

(21) Appl. No.: 18/203,412

(22) Filed: May 30, 2023

(65) Prior Publication Data

US 2024/0406851 A1 Dec. 5, 2024

(51) Int. Cl.
H04W 48/18 (2009.01)
H04W 84/04 (2009.01)

(52) U.S. Cl.
CPC .......... H04W 48/18 (2013.01); H04W 84/042 (2013.01)

(58) Field of Classification Search
CPC ............................ H04W 48/18; H04W 84/042
See application file for complete search history.

(56) References Cited

U.S. PATENT DOCUMENTS

| | | | | |
|---|---|---|---|---|
| 10,506,506 | B2 * | 12/2019 | Qiao | ........................ H04W 8/18 |
| 11,284,250 | B2 * | 3/2022 | Ohlsson | ................ H04W 12/02 |

(Continued)

FOREIGN PATENT DOCUMENTS

| | | | | |
|---|---|---|---|---|
| EP | 3761751 A1 * | 1/2021 | ............ | H04W 76/14 |
| EP | 4443969 A1 * | 10/2024 | .............. | H04W 8/22 |

(Continued)

OTHER PUBLICATIONS

"3rd Generation Partnership Project; Technical Specification Group Core Network and Terminals; Numbering, addressing, and identification; (Release 18)" 3GPP TS 23.003 V18.1.0 (Mar. 2023).

(Continued)

*Primary Examiner* — Julio R Perez
(74) *Attorney, Agent, or Firm* — Jenkins, Taylor & Hunt, P.A.

(57) ABSTRACT

A method for using a network function (NF) repository function (NRF) for mapping single network slice selection assistance information (S-NSSAI) includes, storing at an NRF in a first network, an S-NSSAI mapping database including mappings between S-NSSAI values of the first network and S-NSSAI values of other networks. The method further includes receiving, from a requesting NF in a second network, a request message including a requester S-NSSAI attribute including an S-NSSAI value of the second network. The method further includes performing a lookup in the S-NSSAI mapping database and locating a mapping between the S-NSSAI value of the second network and the S-NSSAI value of the first network. The method further includes generating a response message including the S-NSSAI value of the first network. The method further includes transmitting the response message to the requesting NF in the second network.

20 Claims, 11 Drawing Sheets

(56) References Cited

U.S. PATENT DOCUMENTS

| | | | | | |
|---|---|---|---|---|---|
| 11,533,375 | B2 * | 12/2022 | Zong | ..................... | H04W 60/04 |
| 12,363,619 | B2 * | 7/2025 | Bhalla | ................... | H04W 48/18 |
| 12,457,548 | B2 * | 10/2025 | Sivavakeesar | ........ | H04W 60/04 |
| 2019/0053147 | A1 * | 2/2019 | Qiao | ..................... | H04W 48/18 |
| 2019/0306251 | A1 * | 10/2019 | Talebi Fard | ......... | H04W 76/10 |
| 2021/0058858 | A1 * | 2/2021 | Qiao | ..................... | H04W 60/00 |
| 2021/0243653 | A1 * | 8/2021 | Shih | ...................... | H04W 48/14 |
| 2022/0264444 | A1 * | 8/2022 | Ryu | ...................... | H04W 48/18 |
| 2022/0330117 | A1 * | 10/2022 | Li | .......................... | H04W 28/16 |
| 2023/0379856 | A1 * | 11/2023 | Ryu | ...................... | H04W 12/72 |
| 2024/0348514 | A1 * | 10/2024 | Yang | .................. | H04L 65/1016 |
| 2024/0406851 | A1 * | 12/2024 | Jayaramachar | ....... | H04W 48/18 |
| 2025/0294358 | A1 * | 9/2025 | Mohan Raj | ......... | H04W 12/088 |

FOREIGN PATENT DOCUMENTS

| | | | | | |
|---|---|---|---|---|---|
| WO | WO-2019110081 | A1 * | 6/2019 | ............ | H04W 76/10 |
| WO | WO-2024072752 | A2 * | 4/2024 | ............ | H04W 48/18 |
| WO | WO-2024233956 | A1 * | 11/2024 | ............ | H04W 24/02 |

OTHER PUBLICATIONS

"3rd Generation Partnership Project; Technical Specification Group Core Network and Terminals; 5G System; Technical Realization of Service Based Architecture; Stage 3 (Release 18)" 3GPP TS 29.500 V18.1.0 (Mar. 2023).

"3rd Generation Partnership Project; Technical Specification Group Core Network and Terminals; 5G System; Network Function Repository Services; Stage 3 (Release 18)" 3GPP TS 29.510 V18.2.0 (Mar. 2023).

"3rd Generation Partnership Project; Technical Specification Group Services and System Aspects; System architecture for the 5G System (5GS); Stage 2 (Release 18)" 3GPP TS 23.501, V18.1.0 (Mar. 2023).

* cited by examiner

NFC → NF CONSUMER
NFP → NF PRODUCER

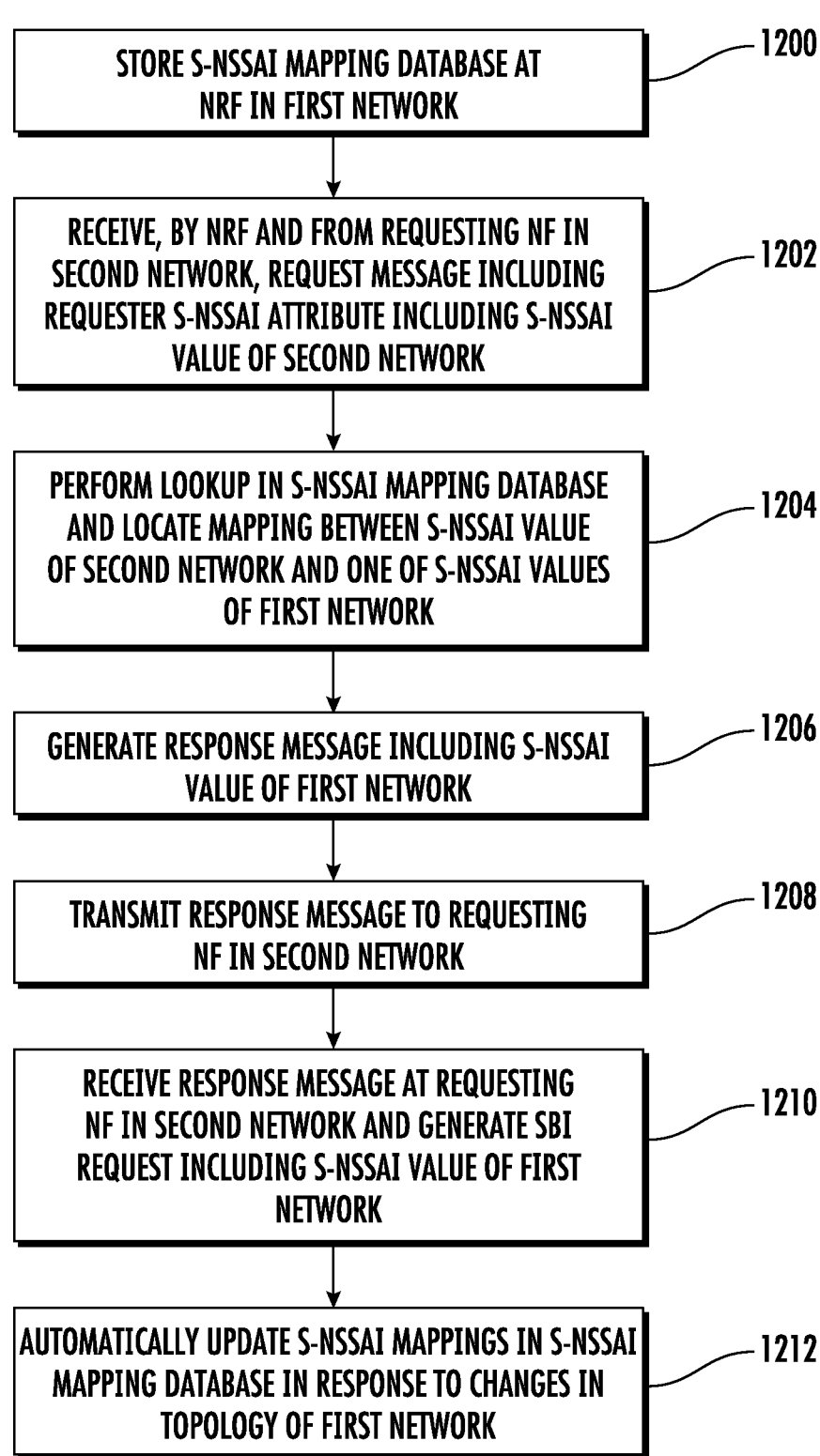

STORE S-NSSAI MAPPING DATABASE AT
NRF IN FIRST NETWORK — 1200

RECEIVE, BY NRF AND FROM REQUESTING NF IN
SECOND NETWORK, REQUEST MESSAGE INCLUDING
REQUESTER S-NSSAI ATTRIBUTE INCLUDING S-NSSAI
VALUE OF SECOND NETWORK — 1202

PERFORM LOOKUP IN S-NSSAI MAPPING DATABASE
AND LOCATE MAPPING BETWEEN S-NSSAI VALUE
OF SECOND NETWORK AND ONE OF S-NSSAI VALUES
OF FIRST NETWORK — 1204

GENERATE RESPONSE MESSAGE INCLUDING S-NSSAI
VALUE OF FIRST NETWORK — 1206

TRANSMIT RESPONSE MESSAGE TO REQUESTING
NF IN SECOND NETWORK — 1208

RECEIVE RESPONSE MESSAGE AT REQUESTING
NF IN SECOND NETWORK AND GENERATE SBI
REQUEST INCLUDING S-NSSAI VALUE OF FIRST
NETWORK — 1210

AUTOMATICALLY UPDATE S-NSSAI MAPPINGS IN S-NSSAI
MAPPING DATABASE IN RESPONSE TO CHANGES IN
TOPOLOGY OF FIRST NETWORK — 1212

FIG. 12

METHODS, SYSTEMS, AND COMPUTER READABLE MEDIA FOR USING NETWORK FUNCTION (NF) REPOSITORY FUNCTION (NRF) TO PROVIDE MAPPING OF SINGLE NETWORK SLICE SELECTION ASSISTANCE INFORMATION (S-NSSAI) FOR ROAMING AND INTER-PUBLIC LAND MOBILE NETWORK (INTER-PLMN) TRAFFIC

TECHNICAL FIELD

The subject matter described herein relates to mapping S-NSSAI for queries relating to inter-PLMN and roaming transactions. More particularly the subject matter described herein relates to using the NRF to provide mapping of S-NSSAI for roaming and inter-PLMN traffic.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for application programming interface (API) messages that are transmitted between PLMNs.

An S-NSSAI value is an identifier used in 5G networks to identify a network slice. S-NSSAI values are often referred to in the plural form as S-NSSAIs. One problem with the current network slice identification scheme is that S-NSSAIs are network-specific. When an NF service consumer sends an NF discovery or a subscription request to an NRF, the NF discovery or subscription request may include a query parameter that identifies requested S-NSSAIs. If the NF service consumer and the NRF are in different networks, the NF service consumer is required to maintain a mapping between the S-NSSAIs in the NF service consumer's network (referred to as requester S-NSSAIs) and the S-NSSAIs in the network of the NRF (referred to as target network S-NSSAIs) and to include the mapped target network S-NSSAIs in subscription requests and discovery requests directed to external networks. Requiring NF service consumers to maintain mappings between requester S-NSSAIs and target network S-NSSAIs is error prone and not scalable.

Accordingly, there exists a need for improved methods, systems, and computer readable media for providing mappings between S-NSSAIs in different networks in a manner that avoids at least some of these difficulties.

SUMMARY

A method for using a network function (NF) repository function (NRF) for mapping single network slice selection assistance information (S-NSSAI) includes storing at an NRF in a first network, an S-NSSAI mapping database including mappings between S-NSSAI values of the first network and S-NSSAI values of other networks. The method further includes receiving, from a requesting NF in a second network, a request message including a requester S-NSSAI attribute including an S-NSSAI value of the second network. The method further includes performing a lookup in the S-NSSAI mapping database and locating a mapping between the S-NSSAI value of the second network and the S-NSSAI value of the first network. The method further includes generating a response message including the S-NSSAI value of the first network. The method further includes transmitting the response message to the requesting NF in the second network.

According to another aspect of the subject matter described herein, at least some of the mappings in the S-NSSAI mapping database include NF type identifiers.

According to another aspect of the subject matter described herein, performing the lookup in the S-NSSAI mapping database includes locating a mapping corresponding to an NF type of the requesting NF in the second network.

According to another aspect of the subject matter described herein, generating the response message including the S-NSSAI value of the first network include generating the response message including the S-NSSAI value of the first network that maps to the S-NSSAI value of the second network corresponding to the NF type of the requesting NF in the second network.

According to another aspect of the subject matter described herein, the NRF serves as a home NRF of the first network.

According to another aspect of the subject matter described herein, the NRF serves as an inter-PLMN NRF of an NRF set serving the first and second networks.

According to another aspect of the subject matter described herein, receiving the request message includes receiving an NF discovery request message and generating the response message includes generating an NF discovery response message including the S-NSSAI value of the first network.

According to another aspect of the subject matter described herein, receiving the request message includes receiving a subscription request message and generating the response message includes generating a subscription created response message including the S-NSSAI value of the first network.

According to another aspect of the subject matter described herein, the method for using the NRF for S-NSSAI mapping includes updating, in the S-NSSAI mapping database, the mappings between the S-NSSAI values of the first network and the S-NSSAI values of the other networks in response to changes in topology in the first network.

According to another aspect of the subject matter described herein, the method for using the NRF for S-NSSAI mapping includes, at the requesting NF in the second network, receiving the response message, generating a service-based interface (SBI) request message including the S-NSSAI value of the first network, and transmitting the SBI request message to the first network.

According to another aspect of the subject matter described herein, a system for using a network function (NF) repository function (NRF) for mapping single network slice selection assistance information (S-NSSAI) is provided. The system includes an NRF including at least one processor and a memory. The system further includes an S-NSSAI mapping database stored in the memory and including mappings between S-NSSAI values of a first network and S-NSSAI values of other networks. The system further includes an inter-PLMN request handler implemented by the at least one processor for receiving, from a requesting NF in a second network, a request message including a requester S-NSSAI attribute including an S-NSSAI value of the second network, performing a lookup in the S-NSSAI mapping database and locating a mapping between the S-NSSAI value of the second network and the S-NSSAI value of the first network, generating a response message including the S-NSSAI value of the first network, and transmitting the response message to the requesting NF in the second network.

According to another aspect of the subject matter described herein, in performing the lookup in the S-NSSAI mapping database, the inter-PLMN request handler is configured to locate a mapping corresponding to an NF type of the requesting NF in the second network.

According to another aspect of the subject matter described herein, in generating the response message including the S-NSSAI value of the first network, the inter-PLMN request handler is configured to include, in the response message, the S-NSSAI value that maps to the S-NSSAI value of the second network corresponding to the NF type of the requesting NF in the second network.

According to another aspect of the subject matter described herein, the NRF is configured to serve as a home NRF of the first network.

According to another aspect of the subject matter described herein, the NRF is configured to serve as an inter-PLMN NRF of an NRF set serving the first and second networks.

According to another aspect of the subject matter described herein, the request message comprises an NF discovery request message and the response message comprises an NF discovery response message including the S-NSSAI value of the first network.

According to another aspect of the subject matter described herein, the request message comprises a subscription request message and the response message comprises a subscription created response message including the S-NSSAI value of the first network.

According to another aspect of the subject matter described herein, the NRF is configured to automatically update the mappings between the S-NSSAI values of the first network and the S-NSSAI values of the other networks in response to changes in topology in the first network.

According to another aspect of the subject matter described herein, a non-transitory computer readable medium having stored thereon executable instructions that when executed by a processor of a computer control the computer to perform steps is provided. The steps include storing, at a network function (NF) repository function (NRF) in a first network, a single network slice selection assistance information (S-NSSAI) mapping database including mappings between S-NSSAI values of the first network and S-NSSAI values of other networks. The steps further include receiving, from a requesting NF in a second network, a request message including a requester S-NSSAI attribute including an S-NSSAI value of the second network. The steps further include performing a lookup in the S-NSSAI mapping database and locating a mapping between the S-NSSAI value of the second network and one of the S-NSSAI values of the first network. The steps further include generating a response message including the S-NSSAI value of the first network. The steps further include transmitting the response message to the requesting NF in the second network.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which:

FIG. 12 is a flow chart illustrating an exemplary process for using the NRF to provide mappings between S-NSSAIs in different networks.

DETAILED DESCRIPTION

Figure 1:
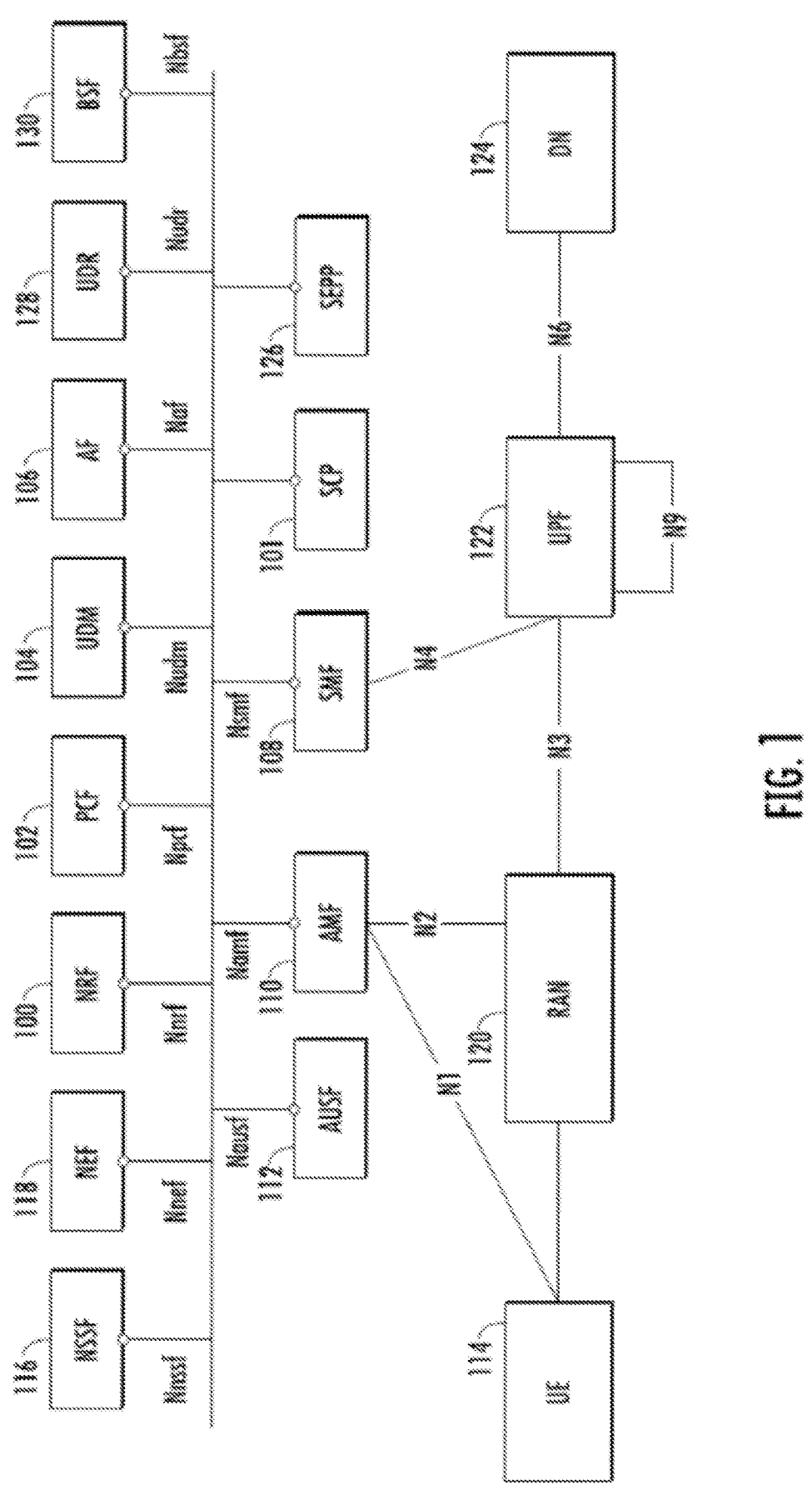
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between PDU sessions and PCFs.

As stated above, one problem with 5G and other network architectures is that S-NSSAIs are network-specific. As a result, NF service consumers must maintain mappings between S-NSSAIs in the network serving the NF service consumers and the S-NSSAIs in the target network. As per 3GPP TS 29.510, section 6.2.3.2.3, an NF service consumer seeking to discover NF service producers shall include the requester-snssais query parameter in NF discovery requests. The NF service consumer must also maintain mappings between S-NSSAIs in the serving PLMN and in the home PLMN. It is expected that the NF service consumer will include the home PLMNs mapped S-NSSAIs in an NF discovery request message if the NF discovery request message is targeted to a PLMN other than the serving PLMN of the NF service consumer.

According to 3GPP TS 29.510, section 6.1.6.2.16, an NF service consumer who wants to subscribe to NF service producers shall include the reqSnssais subscription attribute in the subscriptionData included in subscription request messages. The NF service consumer is required to maintain mappings between S-NSSAIs in the serving PLMN and the home PLMN and to include the mapped home PLMN S-NSSAIs in subscription request messages directed to PLMNs other than the PLMN serving the NF service consumer.

Each NF service consumer in the serving PLMN is required to maintain mappings between the S-NSSAIs in the serving PLMN and the S-NSSAIs in the home PLMN. If there is any new inclusion or decommissioning of a network slice identified by an S-NSSAI, then a network administrator is required to update the mappings affected by the change in network topology at all of the NF service consumers. This model involves very high operating costs, as there could be thousands of NF service consumers. Requiring the S-NSSAI mapping to be configured manually by the network operator on each NF service consumer is non-scalable and error prone, and multiple copies of the same data are stored by the NF service consumers. Updating the S-NSSAIs of all the NF consumers at a given instance of time is not realistic. The subject matter described herein avoids or mitigates at least some of these difficulties by storing and maintaining mappings between S-NSSAIs of other PLMNs and S-NSSAIs of home network at the home NRF. Storing and maintaining the mappings at the home NRF avoids the necessity of provisioning S-NSSAI mappings on all of the consumer NFs in the serving PLMNs and provides a single location where S-NSSAI mappings can be updated in response to changes in network topology.

The S-NSSAI mappings at the home NRF can be extended to include the requester NF type as a field by which a mapping is indexed. For incoming roaming discovery and subscription requests, the home NRF may look up the pre-configured S-NSSAI mapping to process the request based on the requester NF type. For example, if the requester NF type is AMF, then a mapping specific to S-NSSAIs for an AMF will be returned. If the mapping is PCF, a different mapping for the PCF may be returned. The ability to return different S-NSSAI mappings for different NF types increases the efficiency of the mapping process by returning S-NSSAI mappings that are most likely to be relevant to the requesting NF.

Since the mappings are stored in a single centralized location, operating costs are greatly reduced over a solution that maintains these mappings at each NF service consumer. This solution also reduces the likelihood of errors caused by provisioning of incorrect S-NSSAI mappings, as there is only a single copy of each S-NSSAI mapping, except in the case where the NRF is geo-redundantly deployed, in which case each geo-redundant NRF instance will maintain a copy of the S-NSSAI mappings. Any change in S-NSSAIs due to a new S-NSSAI being added to the network, change in S-NSSAI mapping, or decommissioning of an S-NSSAI no longer requires updating S-NSSAI mappings at each of the NF service consumers. This solution is applicable for roaming and inter-PLMN NRF deployment architectures. In the roaming architecture, different NRFs serve the home network and the visited network. In the inter-PLMN network architecture, a single geo-redundant NRF set serves the home and visited networks.

Figure 2A:
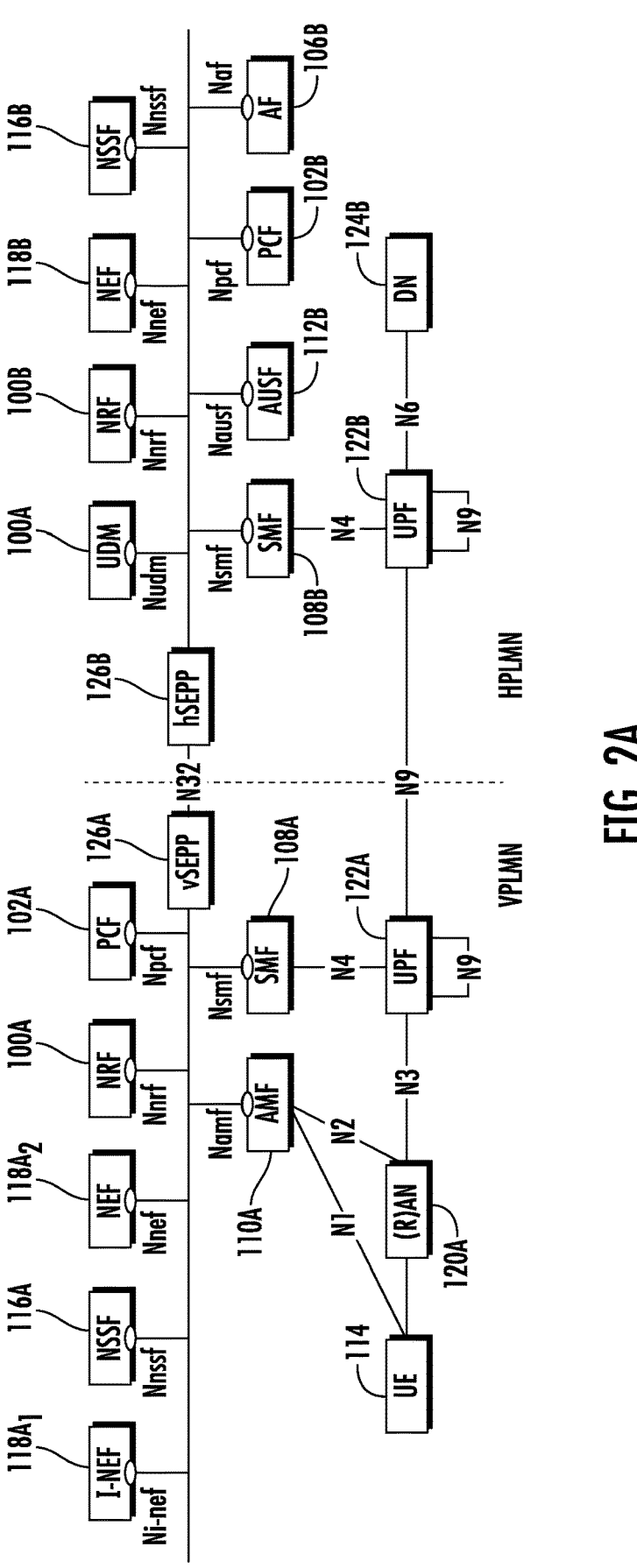
FIGS. 2A and 2B are network diagrams illustrating the 5G roaming network architecture.
Figure 2B:
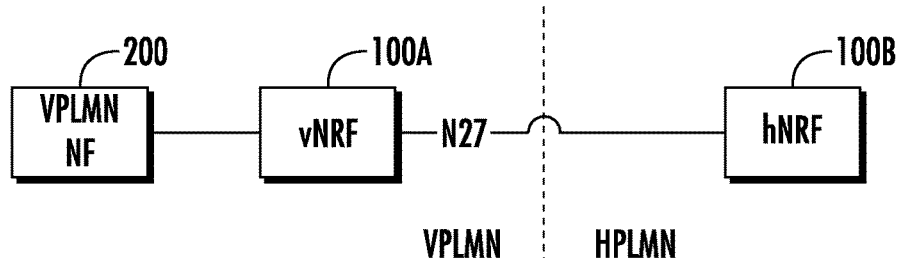

FIGS. 2A and 2B are network diagrams illustrating a 5G roaming network architecture. In FIGS. 2A and 2B, the network functions are numbered correspondingly to those illustrated in FIG. 1 except that those in the visited PLMN include the letter "A" as a suffix, and those in the home PLMN include the letter "B" as a suffix. The NFs illustrated in FIGS. 2A and 2B perform the same operations as those in FIG. 1. Of particular interest to the solution described herein is the NRF, which performs Nnrf service operations, including the NF discovery and NF subscription service operations. For inter-PLMN NF discovery and NF subscription service operations, a consumer NF located in the visited network sends an NF discovery or subscription request to vNRF 100A. vNRF 100A forwards the NF discovery or subscription request to hNRF 100B. hNRF 100B processes the NF discovery or subscription request using the query parameters in the request. According to the subject matter described herein, the query parameters in an inter-PLMN NF discovery or subscription request may include S-NSSAIs of the visited network, which hNRF 100B maps to S-NSSAIs on the home network and responds with the requested NF service producer profile and/or status information.

Figure 3:
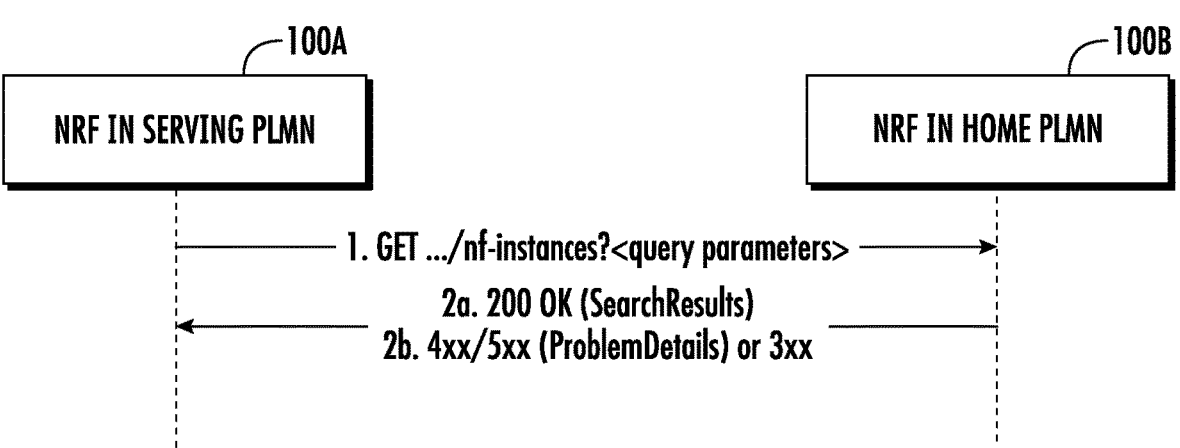
FIG. 3 is a message flow diagram illustrating exemplary messages exchanged for service discovery in a different PLMN from the requesting NF.

FIG. 3 is a message flow diagram illustrating exemplary messages exchanged for service discovery in a different PLMN from the requesting NF. In FIG. 3, it is assumed that an NF service consumer or an SCP has sent an NF discovery request to visited NRF 100A requesting NF profiles of NF service producers located in the home network. In response to the NF discovery request, in step 1 of the message flow diagram, vNRF 100A sends an NF discovery request to hNRF 100B. The NF discovery request includes query parameters that allow hNRF 100B to look up NF and service profiles of NF service producers in the home network. According to an aspect of the subject matter described herein, the query parameters may include requester network S-NSSAIs and requester NF type information. hNRF 100B uses the query parameters and stored inter-PLMN S-NSSAI mappings to respond to vNRF 100A with an NF discovery response, as indicated by step 2*a*. The NF discovery response may include the home network S-NSSAIs that are mapped to the requester network S-NSSAIs and requester NF type (i.e., the NF type of the requesting NF service consumer). If the lookup for NF or service profiles fails, hNRF 100B may respond as indicated in step 2*b* with a 4xx or 4xx message indicating problem details. If the NF discovery request is redirected, hNRF 100B may respond with a 3xx message indicating redirection.

Figure 4:
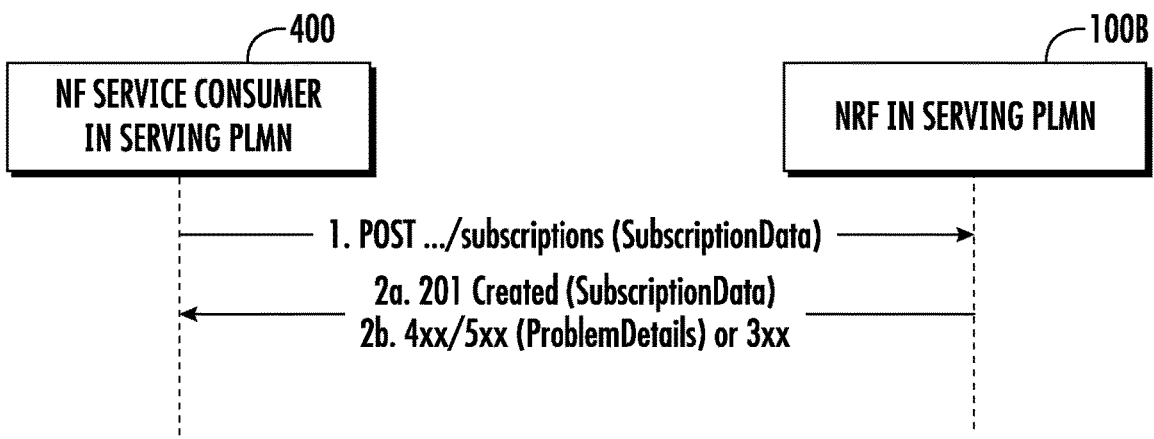
FIG. 4 is a message flow diagram illustrating exemplary messages exchanged for subscribing to NF instances in a different PLMN from the subscribing NF.

FIG. 4 is a message flow diagram illustrating exemplary messages exchanged for subscribing to NF instances in a different PLMN from the subscribing NF. Referring to FIG. 4, in step 1, an NF service consumer 400 sends a subscription request message to an NRF, such as home NRF 100B, located in another PLMN. The subscription request message includes a SubscriptionData attribute, which contains parameters usable to identify a resource to which the subscribing entity desires to subscribe, such as the target NF type, the requester NF type, and requester network S-NS-SAIs. NRF 100B receives the subscription request message, looks up the resource corresponding to the Subscription-Data, including the requester network S-NSSAIs, which NRF 100B maps to S-NSSAIs in the network of NRF 100B. If the lookup is successful, NRF 100B responds as indicated in step 2*a* with a 201 Created message indicating that the requested subscription has been created and including a SubscriptionData attribute, which contains a subscription ID usable to identify the created subscription. If the lookup is not successful or the subscription request is redirected, NRF 100B responds as indicated in step 2*b* with a 4xx or 5xx message specifying problem details or a 3xx message indicating redirection.

Figure 5:
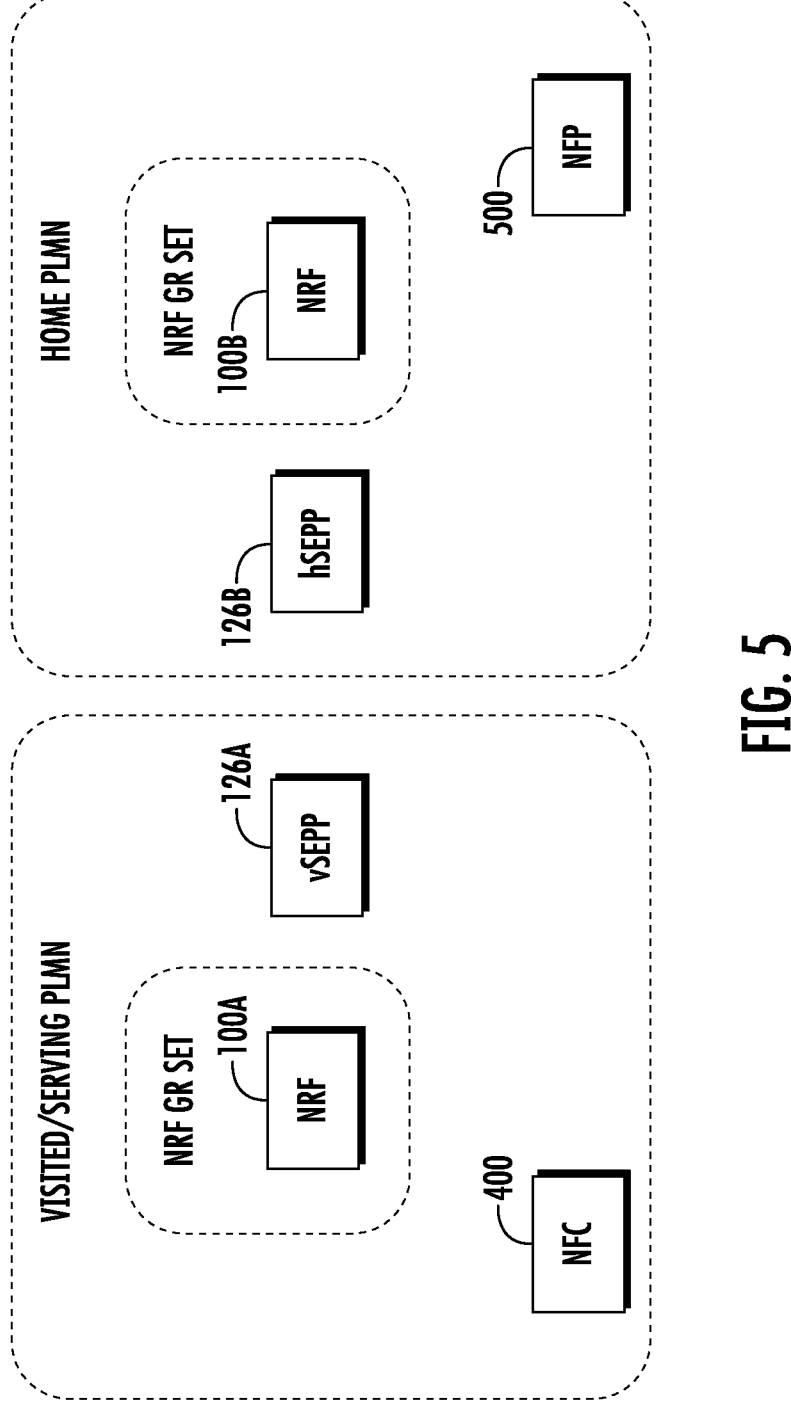
FIG. 5 is a network diagram illustrating an example of an NRF roaming architecture deployment.

FIG. 5 is a network diagram illustrating an example of an NRF roaming architecture deployment. As stated above, in a roaming architecture deployment, each PLMN includes its own NRF. FIG. 5 illustrates components of a home PLMN and a visited PLMN. Each PLMN includes an NRF set. An NRF set is a set of geo-redundant NRFs that share configuration and state data and serve as a highly available system. Each NRF in the NRF set may be configured with mappings between home network S-NSSAIs (i.e., those of the network in which the NRF is located) and S-NSSAIs in other networks. Each NRF may utilize the S-NSSAI mappings to process roaming and/or inter-PLMN discovery and subscription requests in the manner described above. For example, if NF service consumer 400 wishes to subscribe to or discover resources provided by NF service producer 500, NF service consumer 400 need not be configured with the S-NSSAIs of the network of NF service producer 500. Rather, NF service consumer 400 can specify requester network S-NSSAIs in the NF discovery or subscription request, and NRF 100B will map the requester network S-NSSAIs to target network S-NSSAIs and use the target network S-NSSAIs to respond to the NF discovery or subscription request. The network architecture illustrated in FIG. 5 also includes SEPPs 126A and 126B for supporting roaming traffic forwarding between the PLMNs.

Figure 6:
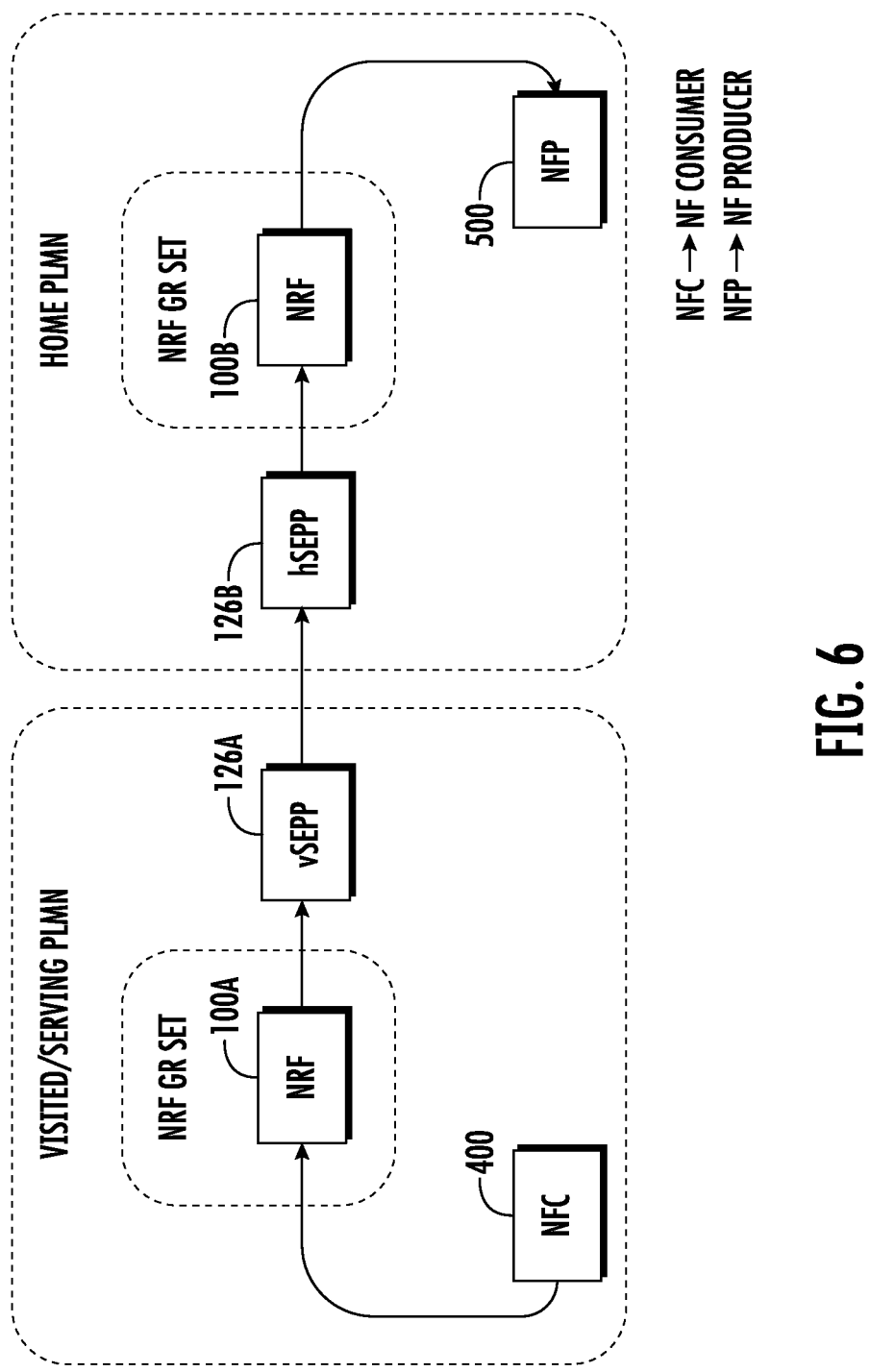
FIG. 6 is a network diagram illustrating a call model for an NRF roaming architecture.

FIG. 6 is a network diagram illustrating a call model for the NRF roaming architecture deployment illustrated in FIG. 5. When NRF 100A receives a request from NF service consumer 400, NRF 100A determines the request to be a roaming request and adds the 3gpp-sbi-target-apiroot header in the request. As per 3GPP TS 29.500 section 6.1.4.3.3, when sending an HTTP request targeting a URI with an authority of a remote PLMN, NFs shall include the 3gpp-Sbi-Target-apiRoot header in the HTTP request, containing the apiRoot of the target URI in the remote PLMN, and shall set the apiRoot in the request URI to the apiRoot of the SEPP. As per 3GPP TS 23.003. the format shall be:

nrf.5gc.mnc<MNC>.mcc<MCC>.3gppnetwork.org

Example: nrf.5gc.mnc012. mcc345.3gppnetwork.org

NRF 100A forwards the request to SEPP 126A. SEPP 126A forwards the request to SEPP 126B. SEPP 126B forwards the request to NRF 100B. NRF 100B processes the request using stored S-NSSAI mappings, as described above.

Figure 7:
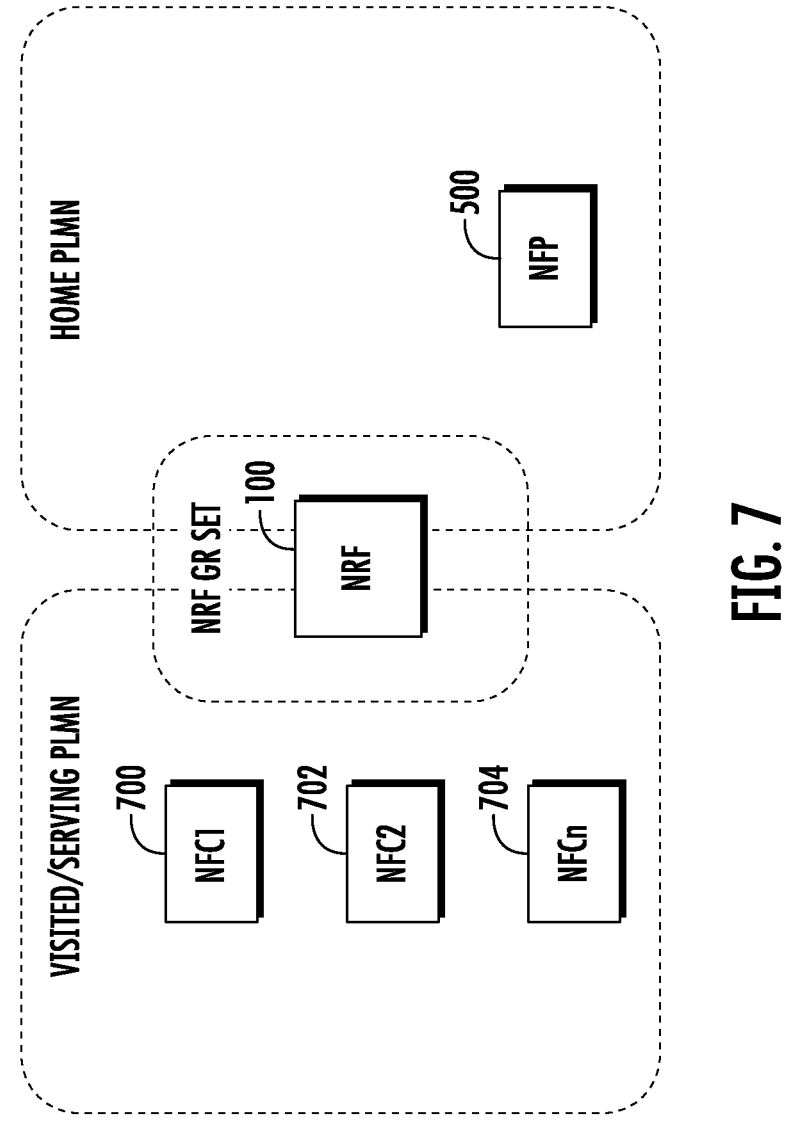
FIG. 7 is a network diagram illustrating an example of an NRF inter-PLMN architecture deployment.

FIG. 7 is a network diagram illustrating an example of an NRF inter-PLMN architecture deployment. In this deployment model, one instance of a geo-redundant NRF set serves both the visited PLMN and home the PLMN. The geo-redundant NRF set is illustrated by NRF 100 in FIG. 7. NF consumers 700, 702, and 704 are located in the visited PLMN, and NF service producer 500 is located in the home PLMN. All of the NF service producers from both PLMNs register with the geo-redundant NRF 100. NF service consumers 700, 702, and 704 send Nnrf service requests to NRF 100. NRF 100 processes the Nnrf service requests based on its state and registration data. NRF 100 may maintain mappings between hPLMN S-NSSAIs and vPLMN S-NS-SAIs and use the mappings to process NF discover and subscription requests, as described above.

Table 1 shown below illustrates the requester-snssais attribute that must be included in NF discovery requests for network slice related services.

TABLE 1

| Requester-snssais Attribute for NF Discovery Requests. | | | | |
|---|---|---|---|---|
| Name | Data Type | P | Cardinality | Description |
| Requester-snssais | Array(Snssai) | O | 1 . . . N | If included, this IE shall contain the list of S-NSSAI of the requester NF. If this IE is included in a service discovery in a different PLMN, the requester NF shall provide S-NSSAI values of the target PLMN, |

TABLE 1-continued

| Requester-snssais Attribute for NF Discovery Requests. | | | | |
|---|---|---|---|---|
| Name | Data Type | P | Cardinality | Description |
| | | | | that correspond to the S-NSSAI values of the requester NF. The NRF shall use this to return only those NF profiles of NF Instances allowing to be discovered from at least one network slice identified by this IE, according to the "allowedNssais" list in the NF Profile and NF Service (see clause 6.1.6.2.2 and 6.1.6.2.3). (NOTE 12) |

From Table 1, the Requester-snssais attribute is required to contain the S-NSSAI values of the target PLMN which correspond to those of the requester PLMN. As indicated above, requiring NF service consumers to maintain such mappings is unduly burdensome on NF service consumers, error prone, and not scalable.

Table 2 shown below illustrates the ReqSnssais attribute that must be included in inter-PLMN subscription requests.

TABLE 2

| ReqSnssaiaS Attribute of Inter-PLMN Subscription Requests | | | | |
|---|---|---|---|---|
| Name | Data Type | P | Cardinality | Description |
| ReqnssaiS | Array(Snssai) | O | 1 . . . N | If included, this IE shall contain the list of S-NSSAIs of the NF Service Consumer that is requesting the creation of the subscription. If this IE is included in a subscription request in a different PLMN, the requester NF shall provide S-NSSAI values of the target PLMN, that correspond to the S-NSSAI values of the requester NF. The NRF shall use it for authorizing the request, in the same way as the "requester-snssais" is used in the NF Discovery service (see Table 6.2.3.2.3.1-1). When the subscription is for a set of NF Instances, the subscription may be accepted by NRF, but it shall only generate notifications from NF Instances whose authorization parameters allow |

TABLE 2-continued

| ReqSnssaiaS Attribute of Inter-PLMN Subscription Requests | | | | |
|---|---|---|---|---|
| Name | Data Type | P | Cardinality | Description |
| | | | | the NF Service Consumer to access their services (NOTE 2). |

From Table 2, the ReqSnssaias attribute of inter-PLMN subscription requests must include the S-NSSAI values of the target PLMN that map to the S-NSSAI values of the requester PLMN, which is burdensome on NF service consumers, error prone, and not scalable.

Figure 8:
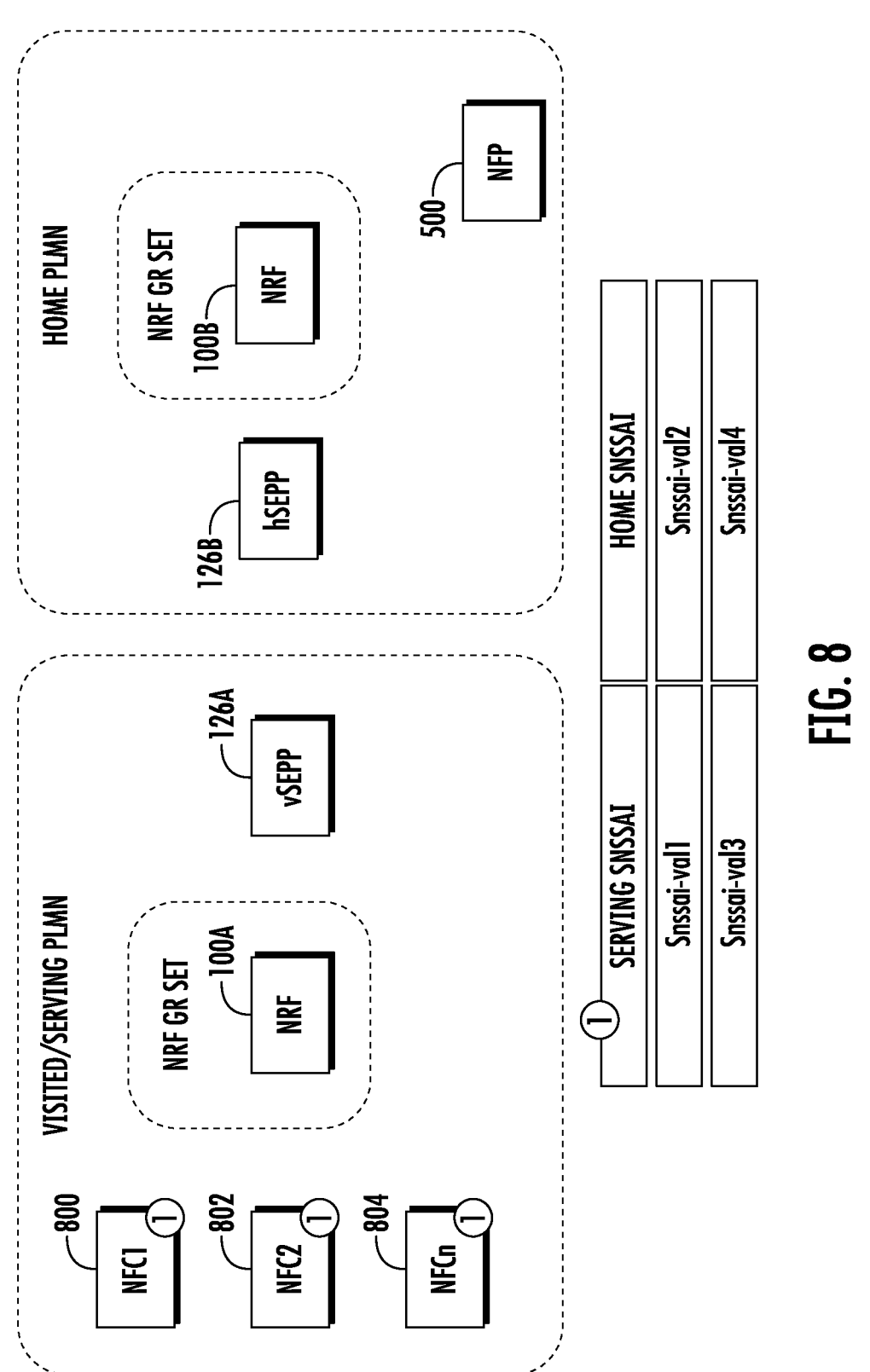
FIG. 8 is a network diagram illustrating a network architecture where NF service consumers maintain mappings between S-NSSAIs in different networks.

FIG. 8 is a network diagram illustrating the NRF roaming architecture deployment of FIG. 5 where NF service consumers maintain mappings between S-NSSAIs in different networks. Referring to FIG. 8, each of NF service consumers 800, 802, and 804 is required to maintain mappings between serving network S-NSSAIs and home network S-NSSAIs, as illustrated by the table labeled "1" in FIG. 8. In this architecture, NF service consumers 800, 802, and 804 must include the home network S-NSSAIs in NF discovery and subscription requests directed to the home PLMN, which is undesirable for the reasons described above.

Figure 9:
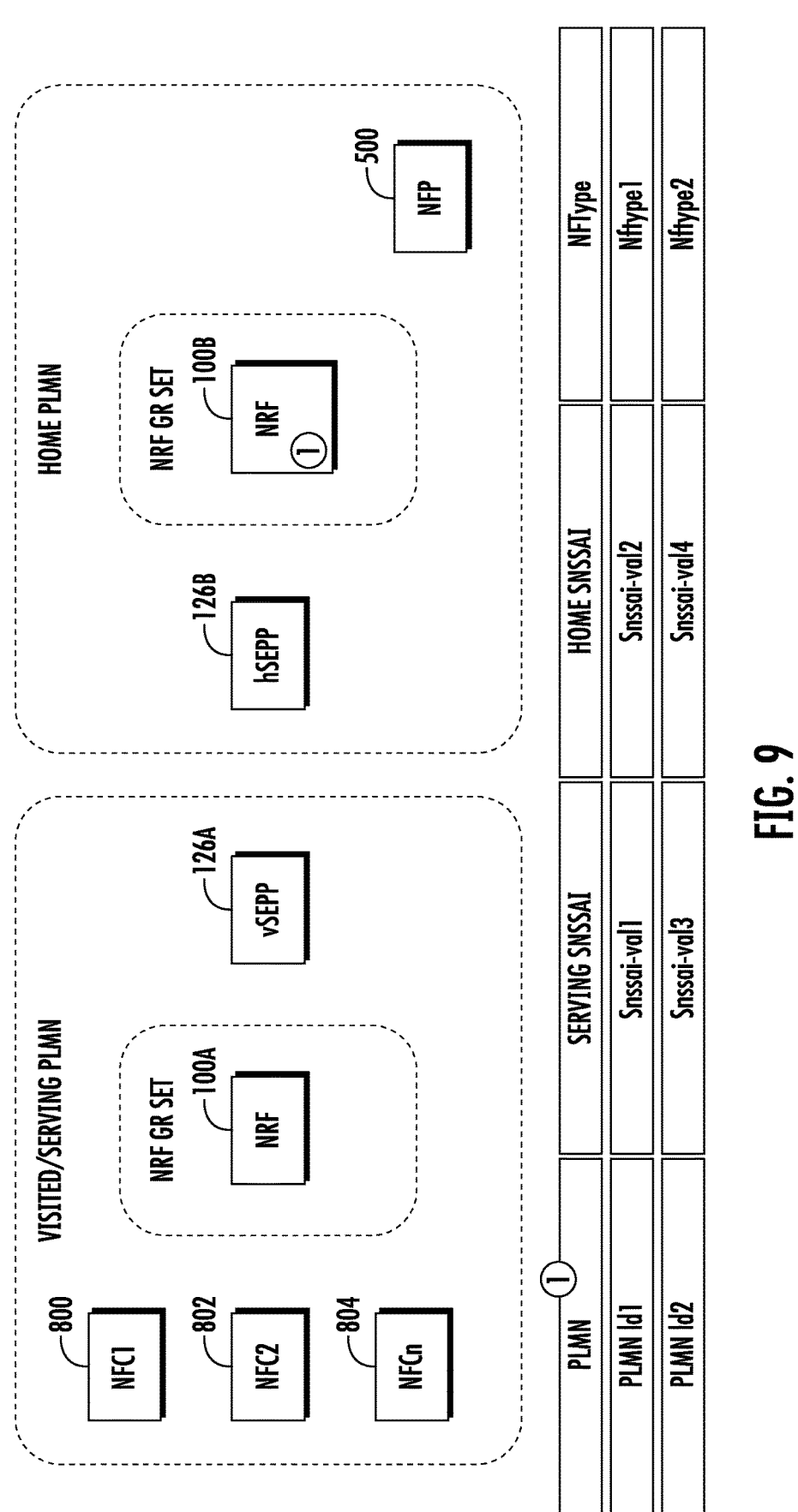
FIG. 9 is a diagram where the NRF maintains mappings between S-NSSAIs in different networks for a roaming architecture.

FIG. 9 is a diagram where the NRF maintains mappings between S-NSSAIs in different networks for the roaming architecture NRF deployment illustrated in FIG. 5. Referring to FIG. 9, hNRF 100B maintains a database of mappings between home network S-NSSAIs (i.e., S-NSSAIs that identify network slices in the network of hNRF 100B) and S-NSSAIs of other networks (i.e., PLMNs or other networks that are separate from the home PLMN). In the illustrated example, each entry or record in the S-NSSAI mapping database is indexed by the PLMN ID of the serving network, an S-NSSAI value in the serving network, and the requesting NF type. In one example, one of NF service consumers 800, 802, and 804 sends an NF discovery or subscription request to vNRF 100A for discovering or subscribing to NF service producer 500 located in the home PLMN. vNRF 100A determines that the discovery or subscription target is in the home PLM and forwards th NF discovery or subscription request to hNRF 100B. vNRF 100A includes, in the discovery or subscription request, PLMN Id1, Snssai-val1, and NFtype1. vNRF 100B is not required to know the home network S-NSSAI corresponding to Snssai-val-1 or include the home network S-NSSAI in an NF discovery or subscription request message.

hNRF 100B will receive the message, perform a lookup in the S-NSSAI mapping database and determine that the home S-NSSAI that maps to this combination of parameters is Snssai-val2. hNRF 100B will send the home S-NSSAI value S-nssai-val2 in an NF discovery or subscription response. hNRF 100A receives the NF discovery or subscription response and sends a corresponding NF discovery or subscription response to the requesting NF service consumer 800, 802, or 804. It should also be noted that in some cases, the requesting NF service consumer may be an SCP that performs delegated discovery on behalf of a consumer NF. The requesting NF service consumer 800, 802, or 804 receives the NF discovery or subscription response, reads the home network S-NSSAI value included in the response, and includes the home network S-NSSAI value in service-based interface (SBI) requests directed to the home PLMN.

Figure 10:
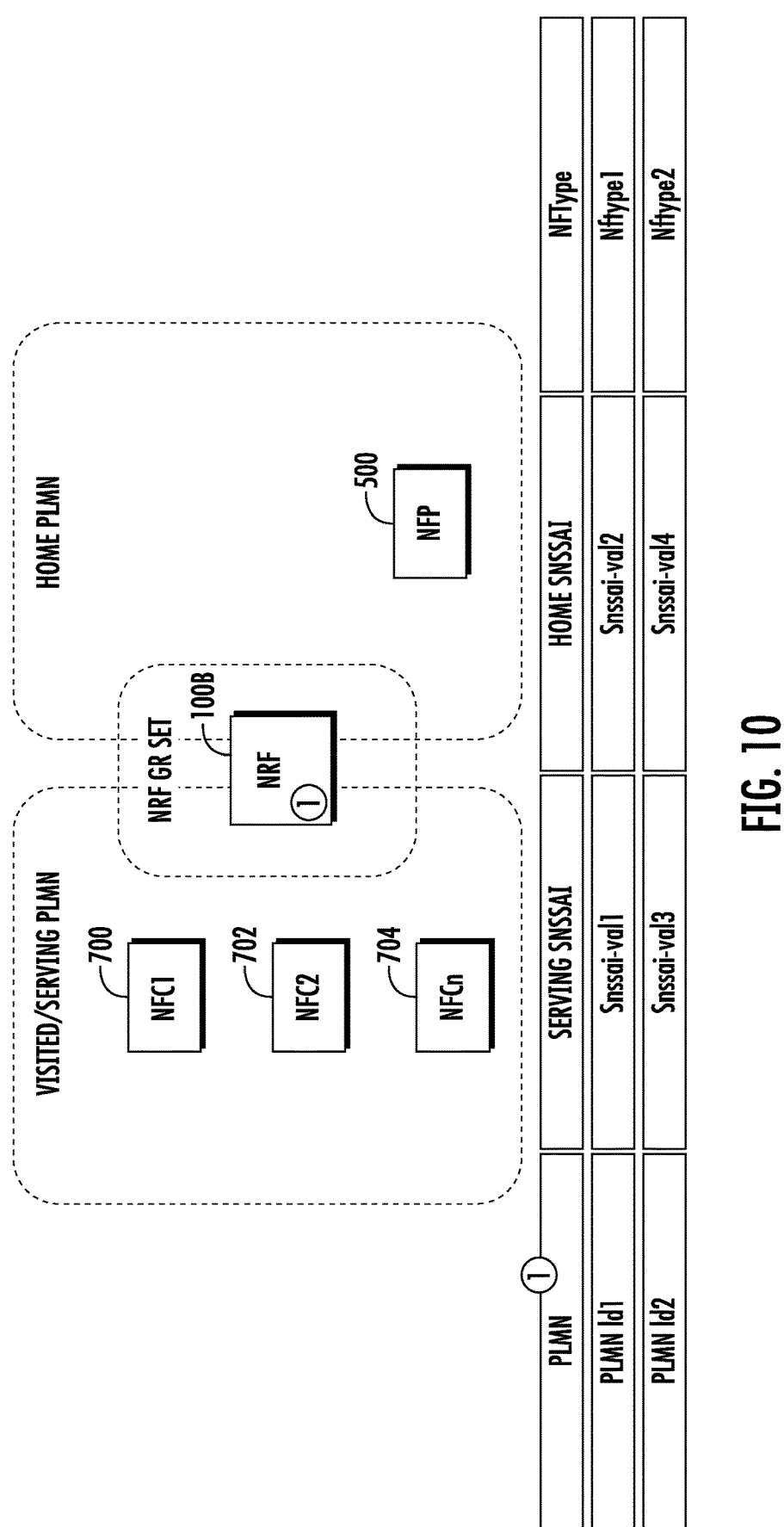
FIG. 10 is a diagram where the NRF maintains mappings between S-NSSAIs in different networks for an inter-PLMN architecture.

FIG. 10 is a diagram where the NRF maintains mappings between S-NSSAIs in different networks for an inter-PLMN NRF architecture deployment of FIG. 6. In FIG. 10, each NRF 100 of the geo-redundant NRF set that serves the home and visited PLMNs may be configured with the S-NSSAI mapping database that maps between S-NSSAIs in different networks. NRF 100 may be configured with the S-NSSAI mapping database so that NF service consumers 700, 702, and 704 located in the visited PLMN do not need to know or maintain mappings between S-NSSAIs visited PLMN and those or the home PLMN. When one of NF service consumers 700, 702, or 704 generates and sends an NF discovery or subscription request with a visited PLMN S-NSSAI to NRF 100 and NRF 100 identifies the NF discovery or subscription request as concerning a resource, such as NF service producer 500 in the home PLMN, NRF 100 may access the S-NSSAI mapping database using the PLMN ID, the S-NSSAI value, and the requesting NF type. NRF 100 locates a corresponding entry or record in the S-NSSIA mapping database and reads the home network S-NSSAI value(s) from the database. NRF 100 then formulates and sends to the requesting NF service consumer 700, 702 or 704 an NF discovery or subscription response including the home network S-NSSAI value. The requesting NF service consumer 700, 702, or 704 may receive the response, read the home network S-NSSAI value from the response, and include the home network S-NSSAI value in messages directed to the home PLMN.

Figure 11:
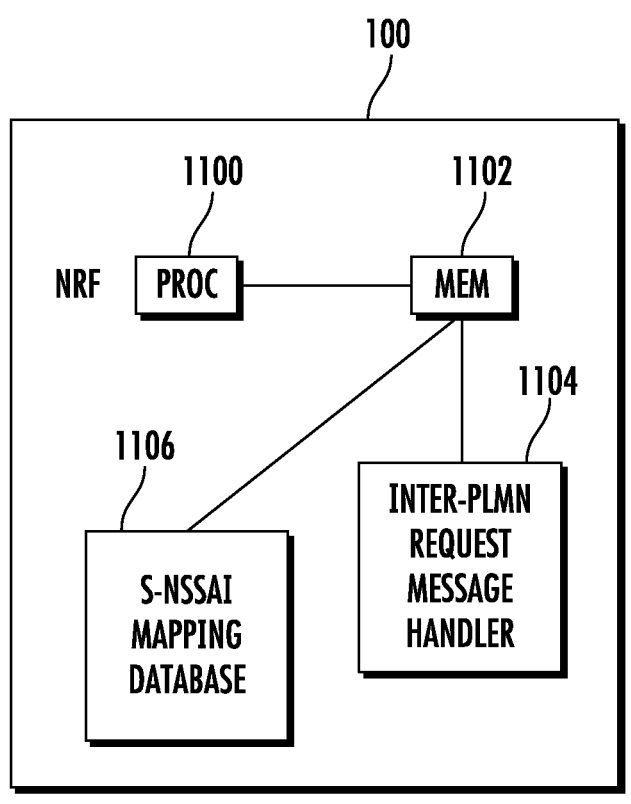
FIG. 11 is a block diagram illustrating an exemplary architecture for an NRF that provides mappings between S-NSSAIs in different networks.

FIG. 11 is a block diagram illustrating an exemplary architecture for an NRF that provides mappings between S-NSSAIs in different networks. Referring to FIG. 11, NRF 100 includes at least one processor 1100 and memory 1102. NRF 100 further includes an inter-PLMN request handler 1104 for processing inter-PLMN service-based interface (SBI) requests, such as inter-PLMN NF discovery and subscription requests. NRF 100 further includes an S-NSSAI mapping database 1106 that can be configured with mappings between home network S-NSSAIs and S-NSSAIs of other networks. The mappings may be indexed by NF type, PLMN ID, and serving or requester network S-NSSAI values. Inter-PLMN request handler 1104 may be implemented using computer executable instructions stored in memory 1102 and executed by processor 1100. S-NSSAI mapping database 1106 may also be stored in memory 1102.

FIG. 12 is a flow chart illustrating an exemplary process for using the NRF to provide mappings between S-NSSAIs in different networks. Referring to FIG. 12, in step 1200, the process includes storing, at an NRF in a first network, an S-NSSAI mapping database including mappings between S-NSSAI values of the first network and S-NSSAI values of other networks. For example, a network operator may configure NRF 100 with an S-NSSAI mapping database that maps S-NSSAIs in the network of NRF 100 to NRFs in other networks. The mappings may be indexed by requester NF type, requester PLMN-ID, and serving or requester network S-NSSAIs.

In step 1202, the process further includes receiving, by the NRF and from a requesting NF in a second network, a request message including a requester S-NSSAI attribute including an S-NSSAI of the second network. For example, NRF 100 may receive an NF discovery or subscription request including a requester S-NSSAI attribute with one or more S-NSSAI values identifying network slices in the requester network. For the roaming architecture NRF deployment illustrated in FIG. 5, the NF discovery or subscription request may be sent from the NRF in the requester network based on an NF discovery or subscription request sent from an NF service consumer or an SCP. For the inter-PLMN architecture NRF deployment illustrated in FIG. 7, the NF discovery or subscription request may be sent from an NF service consumer or an SCP in the serving or requester PLMN.

In step 1204, the process further includes performing a lookup in the S-NSSAI mapping database and locating a mapping between the S-NSSAI value of the second network and one of the S-NSSAI values of the first network. For example, NRF 100 may perform a lookup in S-NSSAI mapping database 1106 using the requester PLMN ID, the requester NF type, and the requester network S-NSSAI value or values in the request message received in step 1202.

In step 1206, the process further includes generating a response message including the S-NSSAI value of the first network. For example, NRF 100 may generate an NF discovery or subscription response message that includes S-NSSAI values that were located in the S-NSSAI mapping database lookup in step 1204.

In step 1208, the process further includes transmitting the response message to the requesting NF in the second network. For example, NRF 100 may transmit an NF discovery or subscription response including S-NSSAI values of the network of NRF 100 that are mapped to the S-NSSAI values in the received request message. The response may be transmitted to the NRF in the requester network for the roaming architecture NRF deployment illustrated in FIG. 5. The response may be transmitted to the NF service consumer or SCP in the inter-PLMN architecture NRF deployment illustrated in FIG. 7.

In step 1210, the process includes receiving the response message and generating an SBI request including the S-NSSAI of the first network. For example, an NF service consumer may receive the response from NRF 100 (either directly or via its serving NRF), extract the target network S-NSSAI value from the response, and use the response in an SBI request directed towards the NRF or one of the NF service producers in the target network.

In step 1212, the process includes automatically updating the S-NSSAI mappings in the S-NSSAI mapping database in response to network topology changes in the first network. NRF 100 may add, delete, or modify mappings in the S-NSSAI mapping database when network slices are newly created, decommissioned, or modified. For example, if a network slice corresponding to a home network S-NSSAI in one or more of the mappings in the S-NSSAI mapping database is decommissioned, NRF 100 may automatically delete S-NSSAI mappings corresponding to the decommissioned network slice. In another example, if a new network slice is added or substituted to provide the same service as an existing network slice, at least some of mappings corresponding to the existing network slice may be modified to map to the S-NSSAI of the new network slice to facilitate load balancing.

Exemplary advantages of the subject matter described herein include that the solution described herein provides a centralized approach of maintaining the data for S-NSSAI mapping which reduces operational costs of creating and maintaining the S-NSSAI mappings on all the consumers in the PLMN/network. This solution may also reduce the likelihood of provisioning errors, as the S-NSSAI mappings are not replicated to multiple different consumer NFs. Any changes in S-NSSAIs due to new S-NSSAI inclusion, S-NSSAI decommissioning, or S-NSSAI modification does not require updating of S-NSSAI mappings at NF service consumers, further reducing operating costs. The solution described herein is applicable for roaming and inter-PLMN NRF deployment architectures.

The disclosure of each of the following references is hereby incorporated herein by reference in its entirety.

REFERENCES 1. 3$^{rd}$ Generation Partnership Project; Technical Specification Group Core Network and Terminals; Numbering, addressing, and identification; (Release 18) 3GPP TS 23.003 V18.1.0 (2023 March)
2. 3$^{rd}$ Generation Partnership Project; Technical Specification Group Core Network and Terminals; 5G System; Technical Realization of Service Based Architecture; Stage 3 (Release 18) 3GPP TS 29.510 V18.1.0 (2023 March)
3. 3$^{rd}$ Generation Partnership Project; Technical Specification Group Core Network and Terminals; 5G System; Network Function Repository Services; Stage 3 (Release 18) 3GPP TS 29.510 V18.2.0 (2023 March)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for using a network function (NF) repository function (NRF) for mapping single network slice selection assistance information (S-NSSAI), the method comprising:
storing, at an NRF in a first network, an S-NSSAI mapping database including mappings between S-NSSAI values of the first network and S-NSSAI values of other networks;
receiving, by the NRF and from a requesting NF in a second network, a request message including a requester S-NSSAI attribute including an S-NSSAI value of the second network;
performing, by the NRF, a lookup in the S-NSSAI mapping database and locating a mapping between the S-NSSAI value of the second network and one of S-NSSAI values of the first network;
generating a response message including the S-NSSAI value of the first network; and
transmitting the response message to the requesting NF in the second network.

2. The method of claim 1 wherein at least some of the mappings in the S-NSSAI mapping database include NF type identifiers.

3. The method of claim 2 wherein performing the lookup in the S-NSSAI mapping database includes locating a mapping corresponding to an NF type of the requesting NF in the second network.

4. The method of claim 3 wherein generating the response message including the S-NSSAI value of the first network includes generating the response message including the S-NSSAI value of the first network that maps to the S-NSSAI value of the second network corresponding to the NF type of the requesting NF in the second network.

5. The method of claim 1 wherein the NRF serves as a home NRF of the first network.

6. The method of claim 1 wherein the NRF serves as an inter-PLMN NRF of an NRF set serving the first and second networks.

7. The method of claim 1 wherein receiving the request message includes receiving an NF discovery request message and wherein generating the response message includes generating an NF discovery response message including the S-NSSAI value of the first network.

8. The method of claim 1 wherein receiving the request message includes receiving a subscription request message and generating the response message includes generating a subscription created response message including the S-NS-SAI value of the first network.

9. The method of claim 1 comprising updating, in the S-NSSAI mapping database, the mappings between the S-NSSAI values of the first network and the S-NSSAI values of the other networks in response to changes in topology in the first network.

10. The method of claim 1 comprising, at the requesting NF in the second network, receiving the response message, generating a service-based interface (SBI) request message including the S-NSSAI value of the first network, and transmitting the SBI request message to the first network.

11. A system for using a network function (NF) repository function (NRF) for mapping single network slice selection assistance information (S-NSSAI), the system comprising:
an NRF including at least one processor and a memory;
an S-NSSAI mapping database stored in the memory and including mappings between S-NSSAI values of a first network and S-NSSAI values of other networks; and
an inter-PLMN request handler implemented by the at least one processor for receiving, from a requesting NF in a second network, a request message including a requester S-NSSAI attribute including an S-NSSAI value of the second network, performing a lookup in the S-NSSAI mapping database and locating a mapping between the S-NSSAI value of the second network and one of the S-NSSAI values of the first network, generating a response message including the S-NSSAI value of the first network, and transmitting the response message to the requesting NF in the second network.

12. The system of claim 11 wherein at least some of the mappings in the S-NSSAI mapping database include NF type identifiers.

13. The system of claim 12 wherein, in performing the lookup in the S-NSSAI mapping database, the inter-PLMN request handler is configured to locate a mapping corresponding to an NF type of the requesting NF in the second network.

14. The system of claim 13 wherein, in generating the response message including the S-NSSAI value of the first network, the inter-PLMN request handler is configured to include, in the response message, the S-NSSAI value of the first network that maps to the S-NSSAI value of the second network corresponding to the NF type of the requesting NF in the second network.

15. The system of claim 11 wherein the NRF is configured to serve as a home NRF of the first network.

16. The system of claim 11 wherein the NRF is configured to serve as an inter-PLMN NRF of an NRF set serving the first and second networks.

17. The system of claim 11 wherein the request message comprises an NF discovery request message and the response message comprises an NF discovery response message including the S-NSSAI value of the first network.

18. The system of claim 11 wherein the request message comprises a subscription request message and the response message comprises a subscription created response message including the S-NSSAI value of the first network.

19. The system of claim 11 wherein the NRF is configured to automatically update the mappings between the S-NSSAI values of the first network and the S-NSSAI values of the other networks in response to changes in topology in the first network.

20. A non-transitory computer readable medium having stored thereon executable instructions that when executed by a processor of a computer control the computer to perform steps comprising:
storing, at a network function (NF) repository function (NRF) in a first network, a single network slice selection assistance information (S-NSSAI) mapping database including mappings between S-NSSAI values of the first network and S-NSSAI values of other networks;
receiving, from a requesting NF in a second network, a request message including a requester S-NSSAI attribute including an S-NSSAI value of the second network;
performing a lookup in the S-NSSAI mapping database and locating a mapping between the S-NSSAI value of the second network and the S-NSSAI of the first network;
generating a response message including the S-NSSAI value of the first network; and
transmitting the response message to the requesting NF in the second network.

* * * * *